United States Patent
Lin et al.

(10) Patent No.: US 6,765,050 B2
(45) Date of Patent: Jul. 20, 2004

(54) COMPLEXES OF CLAY AND POLYOXYALKYLENE AMINE AND METHOD FOR PRODUCING THE SAME

(75) Inventors: Jiang-Jen Lin, Taichung (TW); Yi-Chien Chen, Chang Hua (TW)

(73) Assignee: National Chung-Hsing University, Taichung (TW)

( * ) Notice: Subject to any disclaimer, the term of this patent is extended or adjusted under 35 U.S.C. 154(b) by 221 days.

(21) Appl. No.: 10/039,558

(22) Filed: Jan. 8, 2002

(65) Prior Publication Data

US 2003/0134957 A1 Jul. 17, 2003

(51) Int. Cl.⁷ ................................................. C08K 3/34
(52) U.S. Cl. ........................ 524/445; 524/186; 524/447; 524/448; 524/449; 501/148
(58) Field of Search ................................. 524/445, 451, 524/449, 186; 504/447, 450; 501/147, 148, 149

(56) References Cited

U.S. PATENT DOCUMENTS

| | | | | |
|---|---|---|---|---|
| 5,939,475 A | * | 8/1999 | Reynolds et al. | 524/230 |
| 6,071,988 A | * | 6/2000 | Barbee et al. | 523/210 |
| 6,225,394 B1 | * | 5/2001 | Lan et al. | 524/445 |
| 6,262,162 B1 | * | 7/2001 | Lan et al. | 524/445 |

* cited by examiner

Primary Examiner—Katarzyna Wyrozebski
(74) Attorney, Agent, or Firm—Charles E. Baxley

(57) ABSTRACT

The present invention discloses a complex of clay and polyoxyalkylene amine and a method for producing the same. The clay in the present invention is layered and includes silicate, and the polyoxyalkylene amine with molecular weight over 1,800 is provided as an intercalacting agent to enlarge interlayer distances of the clay at an unprecedented spacing. The method for producing the complex is primarily to acidify the polyoxyalkylene amine with an inorganic acid, which is then mixed with the clay swelled with water previously; and the mixture is then powerfully stirred at 60–80° C. for cation exchanging to obtain the titled inorganic/organic complex. According to the present invention, the complex is an excellent surfactant and a reinforcing agent of polymers.

10 Claims, 3 Drawing Sheets

COMPLEXES OF CLAY AND POLYOXYALKYLENE AMINE AND METHOD FOR PRODUCING THE SAME

BACKGROUND OF THE INVENTION

1. Field of the Invention

The present invention relates an inorganic/organic complex of clay and polyoxyalkylene amine and a method for producing the same, the complex in which can be particularly applied to oily surfactants and reinforcing agents of polymers.

2. Description of the Related Technology

Currently, inorganic/organic polymer composite materials under a nanoscale regime are one of the most significant materials, and thus have been widely investigated and developed. Such composite materials are dual-phased wherein at least one phase is dispersed under a nanoscale regime. Accordingly, compatibility between the two phases, for example, clay and polymers, is always essential for the nanoscale dispersion.

For layered silicate clay which is hydrophilic and immiscible with most organic solvents, the interlayer distances can be enlarged by means of intercalating with organic quaternary ammonium, and thus monomers are allowed to enter therethrough. The monomers can be polymerized to obtain an exfoliated inorganic/organic polymer composite material. In principle, the distances, enlarged by intercalating agents, are constant and required to be wide enough for monomer or polymer molecules to enter. As for exfoliation, the interlayer distances are irregular and different directions may occur in each layer.

Conventional intercalating agents such as 12-aminolauric acid, hexadecylamine, fatty amine, bis(2-hydroxyethyl) methyl tallow alkyl ammonium chloride and stearylamine, usually have low molecular weights, and interlayer distances of the clay can be expanded to a certain degree.

Referring to the research of T. J. Pinnavaia (Michigan State University), intercalating agent $CH_3(CH_2)_n$—$NH_3^+$ is provided to mixed with montmorillonite (MMT), which is then dispersed in diglycidyl ether of BPA (epoxy resin Epon828) to form a polyether-clay composite material under a nanoscale regime. For such intercalating agent, the interlayer distances can be enlarged to 18.0 Å. The epoxy resin can then form an epoxy/clay material through self polymerization at 75° C. This reference also indicates an improvement in heat distortion temperature. The intercalating agent performs a rule of monolayer to bilayer, and even to pseudo-trimolayer. The interlayer distance ranges between 13.8–18.0 Å, which allow the epoxy resin to enter and polymerize therein, and further to exfoliate the layered inorganic matter so that application effect of nonomaterials can be achieved.

Japanese Patent No. 8-22946 discloses the first commercial inorganic/organic polymer composite material under a nanoscale regime, which is developed by Toyota company. This composite material is produced by dispersing $[H_3N^+ (CH_2)_{11}COO^-]$-montmorillonite in Nylon 6, wherein the aminocarboxylic acid is provided as an intercalating agent and the polymers are formed between layers of the clay through condensation of caprolactam monomers. However, the aminocarboxylic acid doesn't facilitate nonpolar polymers such as polyethylene and polypropylene, to uniformly disperse in the hydrophilic layered silicate. Accordingly, Japanese Patent Publication No. 8-53572 provides organic onium ions as an intercalating agent to mix with layered silicate, which can be uniformly dispersed in molten polyolefin resin. Unfortunately, though the organic onium ions can enlarge the interlayer distances, affinity between the intercalating agent and the polyolefin resin is not enough to exfoliate the layered silicate. Further, Japanese Patent Publication No. 10-182892 indicates that when blending in a molten mixture containing olefin oligomers with H-bond and polyolefin resin, the organized layered silicate might be indefinitely swelled due to the strong affinity therebetween. However, it's a dilemma whether to increase the oligomers for better dispersing or to decrease the oligomers for better mechanical characteristics.

Accordingly, there is a need to ameliorate the composites by means of providing appropriate intercalating agents which could render the intercalated silicates with a wider interlayer distance. Furthermore, the widely opened silicates can be used as novel inorganic/organic surfactants, an important industrial application but deviated from the common nanocomposite usage.

SUMMARY OF THE INVENTION

The object of the present invention is to provide a compolex of clay and polyoxyalkylene amine and a method for producing the same, so that the complex is stable enough and has excellent affinity for polymers and organic matters.

In order to achieve the above object, the complex of the present invention primarily includes polyoxyalkylene amine having molecular weight over 1,800 as an intercalating agent and inorganic layered silicate clay.

The polyoxyalkylene amine aforementioned can be polyoxyalkylene diamine, and preferably polyoxypropylene diamine. The commercial product includes Jeffamine series having structure as the following scheme, for example, D-2000 (poly(propyleneglycol) bis (2-aminopropyl ether)), D-4000 (poly(propylene glycol) bis (2-aminopropyl ether)), etc. Additionally, T-3000 (tri-functional poly (propyleneglycol) 2-aminopropyl ether), T-5000 (tri-functional poly(propylene glycol) 2-aminopropyl ether), etc., can be applied, too.

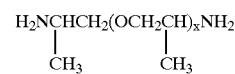

X=2–3 (Approx. m.w.=230; Jeffamine® D-230)
X=5–6 (Approx. m.w.=400; Jeffamine® D-400)
X=33 (Approx. m.w.=2000; Jeffamine® D-2000)
X=68 (Approx. m.w.=4000; Jeffamine® D-4000)

The layered silicate clay used in the present invention is not restricted, and preferably montmorillonite, kaolin, mica or talc. In general, the clay with CEC (cation exchange capacity) ranging between 50–200 meq/100 g is preferred.

The method for producing the complex of the present invention is primarily to acidify the polyoxyalkylene amine with an inorganic acid, which is then mixed with the clay swelled with water previously, and then the mixture is powerfully stirred at 60–80° C. for cation exchanging to obtain the inorganic/organic complex.

In the above method, —$NH_2/H^+$ for acidifying the polyoxyalkylene amine is preferably at 2/1 in mole, i.e., a half of the polyoxyalkylene amine is acidified to form a bilayer status. The polyoxyalkylene amine is preferably added at least equal to cation exchange equivalence of the layered inorganic silicate clay, so that enough energy can be supplied to expand interspace of the clay. The inorganic acid is also not restricted, and preferably chloric acid, sulfuric acid, phosphoric acid or nitric acid.

According to the present invention, the complex of clay and polyoxyalkylene amine is hydrophobic, rather than hydrophilic as before the intercalation, and compatible with polymers. The interlayer distances can be enlarged to 48–92 Å, so that polymers are easily further dispersed therein under a nanoscale regime to form inorganic/polymer composite material. The complex can be applied as an oily surfactant and be used to improve characteristics of polymers.

DETAILED DESCRIPTION OF THE INVENTION

Figure 1:
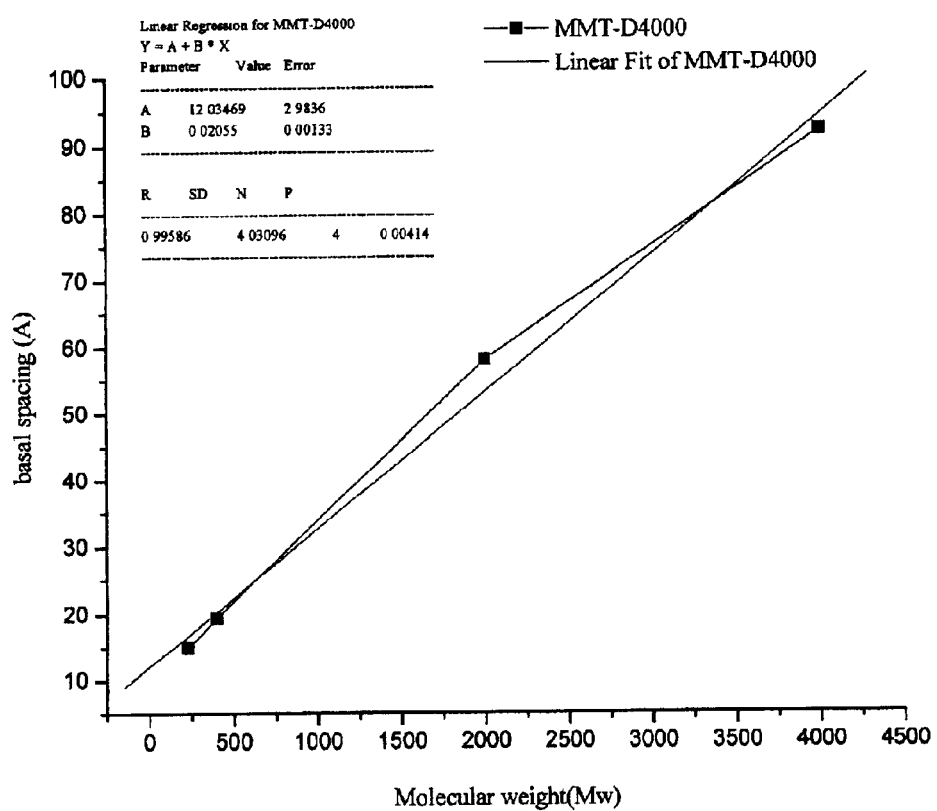
FIG. 1 shows linear regression for the interlayer distances of the clay to molecular weights of the intercalating agents.

In order to explicitly explain the present invention, some preferred examples are described in detail as the follows. However, it should be noticed that the scope of the present invention can't be limited to these examples.

In these examples, montmorillonite (MMT) is used, which is alumino-silicate clay, and has a structural formula including two layers of tetrahedral silicate and one layer of octahedral alumina therebetween. In general, montmorillonite has a primary structure or structural unit of average 8–10 parallel layers, about 8–10 nm (i.e., 80–100 Å) in height wherein each layer is 9.6–10 Å thick, and 12 Å distance between layers by X-ray analysis which includes the thickness of alunino-silicates. A secondary structure of the montmorillonite is about size 0.1–10μ in diameter and can be formed by aggregating hydrophilic silicate thereof.

The clay such as montmorillonite (MMT) may have cation exchange capacity (CEC) in a wide range, and preferably within 50–200 meq/100 g. Beyond such a range, the clay is difficult to be swelled because of insufficient ion exchange and excessive attraction between layers.

EXAMPLES 1–6 AND COMPARATIVE EXAMPLES 1–5

The complexes of the present invention are produced according to steps of:

Step 1: Swelling the Layered Inorganic Silicate Clay

Montmorillonite Kunipia F (Na$^+$-MMT, CEC=115 meq/100 g) is dispersed in 1,000 ml, 80° C. water, and then powerfully stirred for four hours to form an earth-colored stable uniform slurry in water.

Step 2: Acidifying the Intercalating Agents

The intercalating agents as listed in Table 1 are respectively dissolved in 100 ml ethanol/water, and then respectively added into equivalent moles of hydrochloric acid at normal temperature to perform acidification for 30 minutes. The acidified diamines are generally soluble in water and appropriate for the intercalating.

Step 3: Intercalating the Amine Salts to the Layered Inorganic Silicate Clay

The acidified solution of Step 2 is added into the slurry of Step 1 in ratios of Table 1, and then powerfully stirred at 60–70° C. for six hours to perform cation exchange or intercalating process. The mixture is then settled and filtered. The bouffant solid is washed with water and ethanol for several times to remove unreacted intercalating agents and montmorillonite. The product is then dried in a vacuum oven for 24 hours to remove water and ethanol. The earth-colored and sticky solid complex can be observed with SEM and elemental analysis to show no Na$^+$ in the samples. The interlayer distances are detected with X-ray diffraction, and the results are listed in Table 1.

TABLE 1

|  | Intercalating agent | Molecular weight | Intercalating agent/clay (w/w %) | Interlayer distance (Å) |
|---|---|---|---|---|
| Example 1 | D-2000 | 2,000 | 63/37 | 58.0 |
| Example 2 | D-4000 | 4,000 | 72/18 | 92.0 |
| Example 3 | T3000 | 3,000 | 76/24 | 62.6 |
| Example 4 | T5000 | 5,000 | 84/13 | >92.0 |
| Comparative Example 1 | None | — | 0/100 | 12.4 |
| Comparative Example 2 | D-230 | 230 | 23/77 | 15.0 |
| Comparative Example 3 | D-400 | 400 | 35/65 | 19.4 | w/w: the ratios of intercalating agents to clay are detected by thermal gravimetric analysis (TGA), by burning off organic matters and estimating the relative weights.

As shown in Table 1, interlayer distances of the clay obviously increase with molecular weights of the intercalating agents, which are also brought to linear regression, and a line with a correlation coefficient 0.99586 is obtained as shown in FIG. 1.

Figure 2:
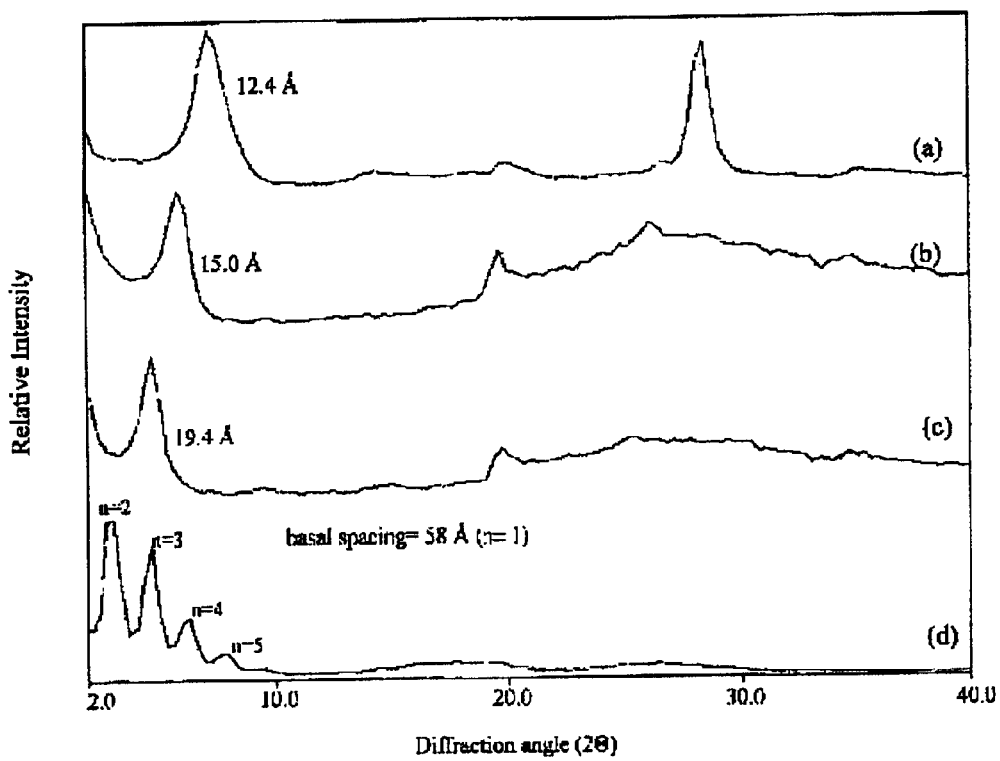
FIG. 2 shows detecting results of X-ray diffraction for different intercalating agents.

FIG. 2 shows the detecting results of X-ray diffraction for MMT, MTT/D-230, MMT/D-400, and MMT/D-2000. For MMT/D-2000, regular arrangement between layers and five peaks (according to Bragg equation n=1 to 5) are observed and the interlayer distances can be expanded to 58 Å.

Additionally, different ratios of intercalating agent D-2000 to montmorillonite as listed in Table 2 are applied in Examples 1, 5, 6 and Comparative Examples 4, 5. The obtained complexes are then analyzed with X-ray diffraction to detect the interlayer distances thereof, which are also listed in Table 2.

TABLE 2

|  | Moles of D-2000 /CEC of clay | Intercalating agent/clay (w/w %) | Interlayer distance (Å) |
|---|---|---|---|
| Example 1 | 1:1 | 63/37 | 58 |
| Example 5 | 3:2 | 64/36 | 58 |
| Example 6 | 2:1 | 65/35 | 59 |
| Comparative Example 4 | 1:5 | 35/65 | 19 |
| Comparative Example 5 | 1:2 | 52/48 | 19 |

Table 2 indicates that the interlayer distances are not large enough when less moles of the intercalating agents than the maximum CEC of the clay are added, because high attraction exists between layers of the clay with stable charges. However, when an equivalent amount of the intercalating agents are used, the interlayer distances can reach to and keep around 58 Å because of proper arrangement of the intercalating agents in the layers. The results indicate the appropriate amount of intercalating agents is important for achieving the highest intercalating efforts.

Additionally, in order to confirm effect of the complexes dispersing in polymer, different organic solvents, in which the hydrophilic natural clay is immiscible, are provided. Table 3 shows dispersing statuses of the complexes which are mixed with various organic solvents by ultrasonic vibrations.

TABLE 3

|  | Toluene | n-Hexane | Acetonitrile | Ethanol | Water |
|---|---|---|---|---|---|
| MMT | − | − | − | − | ++ |
| MMT/D-230 | − | − | + | + | − |
| MMT/D-2000 | ++ | + | + | + | − |

−: not dispersing
+: dispersing but partially aggregating after keeping static for a long time
++: well dispersing and stable suspension after keeping static for a long time According to Table 3, the clay becomes partially nonpolar and thus miscible with organic solvents, particularly toluene, because the intercalating agents D-2000 are induced thereto. For comparison, the unmodified MMT is dispersible in water but too hydrophilic for dispersing in toluene and organic solvents. The D-230 modified MMT has deviated from the hydrophilicity, however, it is not hydrophobic enough for toluene dispersing. The results clearly demonstrate the amphiphilicity between the hydrophilic and hydrophobic properties.

Figure 3:
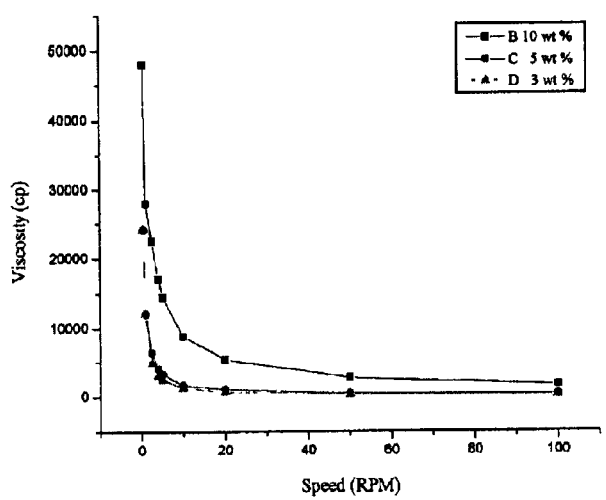
FIG. 3 shows viscosities of MMT/D-2000 mixed in toluene at different concentrations.

FIG. 3 shows high viscosities of MMT/D-2000 dispersed in toluene at different concentrations because of pseudo-crosslinking formed between the negative-charged clay and the positive-charged acidified ammonium at multiple sites.

Figure 4:
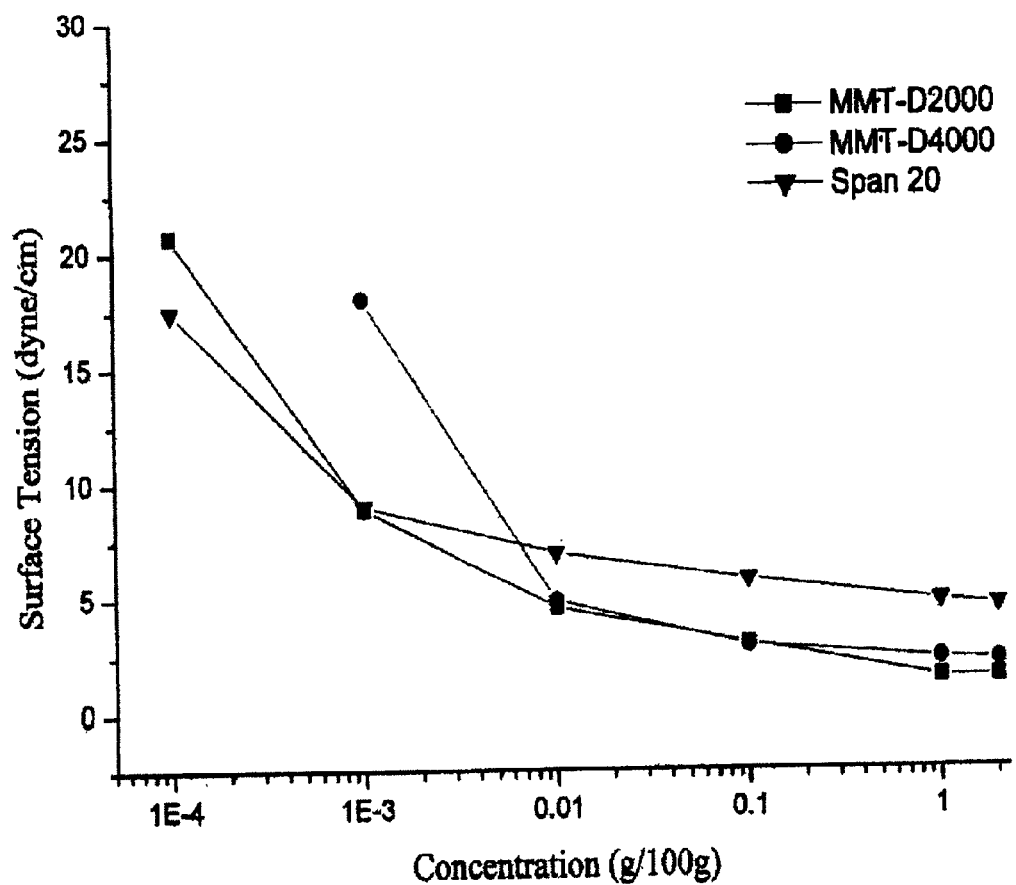
FIG. 4 shows surface tensions of toluene/water in which the complexes of the present invention are applied at different concentrations.

FIG. 4 shows interfacial tensions of toluene/water which significantly lower with concentrations of the complexes MMT/D-2000 and MMT/D-4000. Particularly, the complex MMT/D-2000 enables the interfacial tensions of toluene/water to decrease from 36.5 dyne/cm to 1.5 dyne/cm, and has a critical micelle concentration around 10 ppm. Such phenomenon is beneficial to uniformly dispersing inorganic clay in polymers under a nanoscale regime. The surfactancy or efficacy for lowering the toluene/water interfacial tension is extremely high. Compared with a commercial surfactant, Span 20 (sorbitan monolaurate, m.w.=346), the complexes MMT/D-2000 and MMT/D-4000 of the present invention more effectively reduce the surface tensions of toluene/water as shown in FIG. 4. Hence, these inorganic/organic complexes can be considered as preformed micelle complexes with high thermal stability.

Therefore, it can be analogized that polymers such as epoxy resin, polypropylene (PP), polyethylene glycol terephthalate (PET), polystyrene (PS), syndiotactic polystyrene (SPS), polyurethane (PU), Nylon and styrene-acrylnitrile copolymer (SAN), can be easily dispersed in these complexes under a nanoscale regime to form inorganic/organic composite materials. Furthermore, characteristics of polymers such as resistance to heat distortion, gas barrier properties, rigidity, etc., may be improved by mixing with these polymers to form various kinds of nanocomposites.

What is claimed is:

1. A complex of clay and polyoxypropylene diamine, wherein said clay is layered and includes silicate, and said polyoxypropylene diamine is provided as an intercalating agent has molecular weight over 1,800.

2. The complex of claim 1, wherein said clay is selected from a group consisting of montmorillonite, kaolin, and mica.

3. The complex of claim 1, wherein said clay has a cation exchange capacity between 50–200 meq/100 g.

4. A method for producing a complex of clay and polyoxypropylene diamine, wherein said clay is layered and includes silicate; said method is primarily to acidify said polyoxypropylene diamine with an inorganic acid, which is then mixed with said clay swelled with water previously; the mixture is then powerfully stirred at 60–80° C. for cation exchanging to obtain said complex.

5. The method of claim 4, wherein said clay is selected from a group consisting of montmorillonite, kaolin, and mica.

6. The method of claim 4, wherein said clay has a cation exchange capacity between 50–200 meq/100 g.

7. The method of claim 4, wherein said polyoxyalkylene amine is added at least equal to cation exchange equivalence of said clay.

8. The method of claim 4, wherein said inorganic acid is selected from a group consisting of hydrochloric acid, sulfuric acid, phosphoric acid and nitric acid.

9. The method of claim 4, wherein said complex is applied as an oily surfactant.

10. The method of claim 4, wherein said complex is applied as an reinforcing agent of polymers.

\* \* \* \* \*